United States Patent [19]

Holt

[11] 4,345,515
[45] Aug. 24, 1982

[54] SLIDABLE BRUSH AND SCREW LINEAR DRIVE ARRANGEMENT

[75] Inventor: David Holt, Cambridge, England

[73] Assignee: Pifco Limited, Failsworth, England

[21] Appl. No.: 235,271

[22] Filed: Feb. 17, 1981

[30] Foreign Application Priority Data

Feb. 23, 1980 [GB] United Kingdom ............... 8006210
Mar. 6, 1980 [GB] United Kingdom ............... 8007606

[51] Int. Cl.³ ............................................. A47J 37/08
[52] U.S. Cl. ............................... 99/393; 74/424.8 R; 99/327
[58] Field of Search .................. 74/405, 424.8 R; 99/326, 327, 331, 332, 334, 335, 385, 386, 387, 389, 391, 393, 400, 401

[56] References Cited

U.S. PATENT DOCUMENTS 2,857,838 10/1958 Palmer ................. 74/424.8 R X
3,106,352 10/1963 Bennett ................ 74/424.8 R X

*Primary Examiner*—Billy J. Wilhite
*Attorney, Agent, or Firm*—Sughrue, Mion, Zinn, Macpeak and Seas

[57] ABSTRACT

A linear drive arrangement comprises a prime mover which is capable of rotatably driving a screw threaded rod. A carriage is mounted on the rod and carries a plurality of bristles, for example in the form of a brush, which bristles contact the surface of the screw threaded rod. Rotation of the rod by the prime mover causes the bristles to follow screw thread of the rod to drive the carriage along the rod. The advantage of this is that no clutch mechanism is required as if force is applied to the carriage either to prevent it from moving along the rod or to push it along the rod, the bristles will flex to ride over the screw threaded surface of the rod.

9 Claims, 6 Drawing Figures

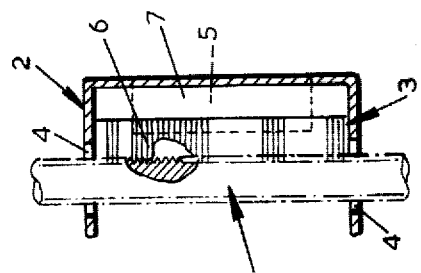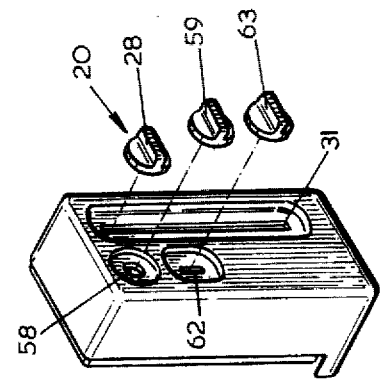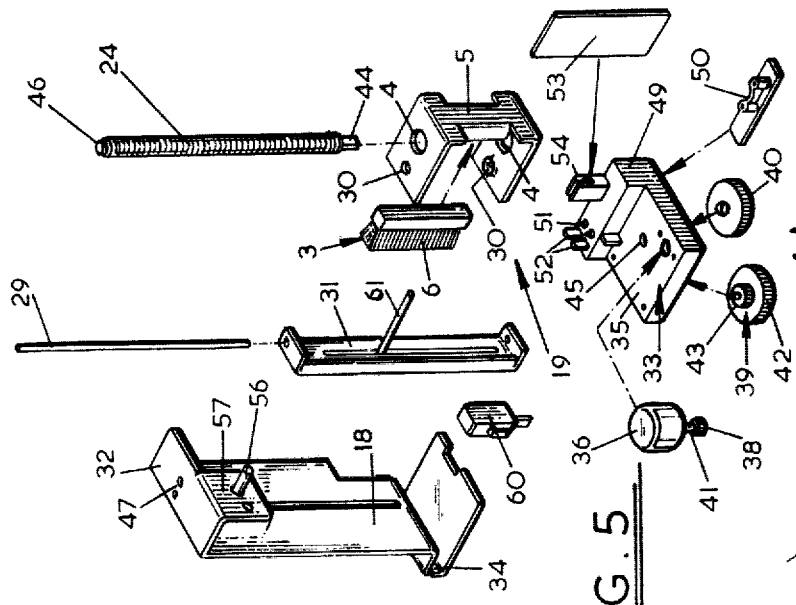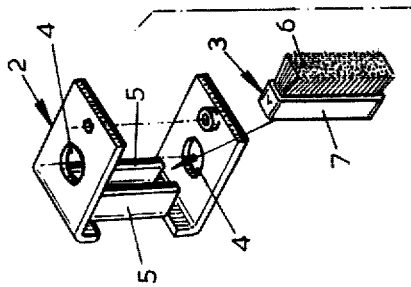

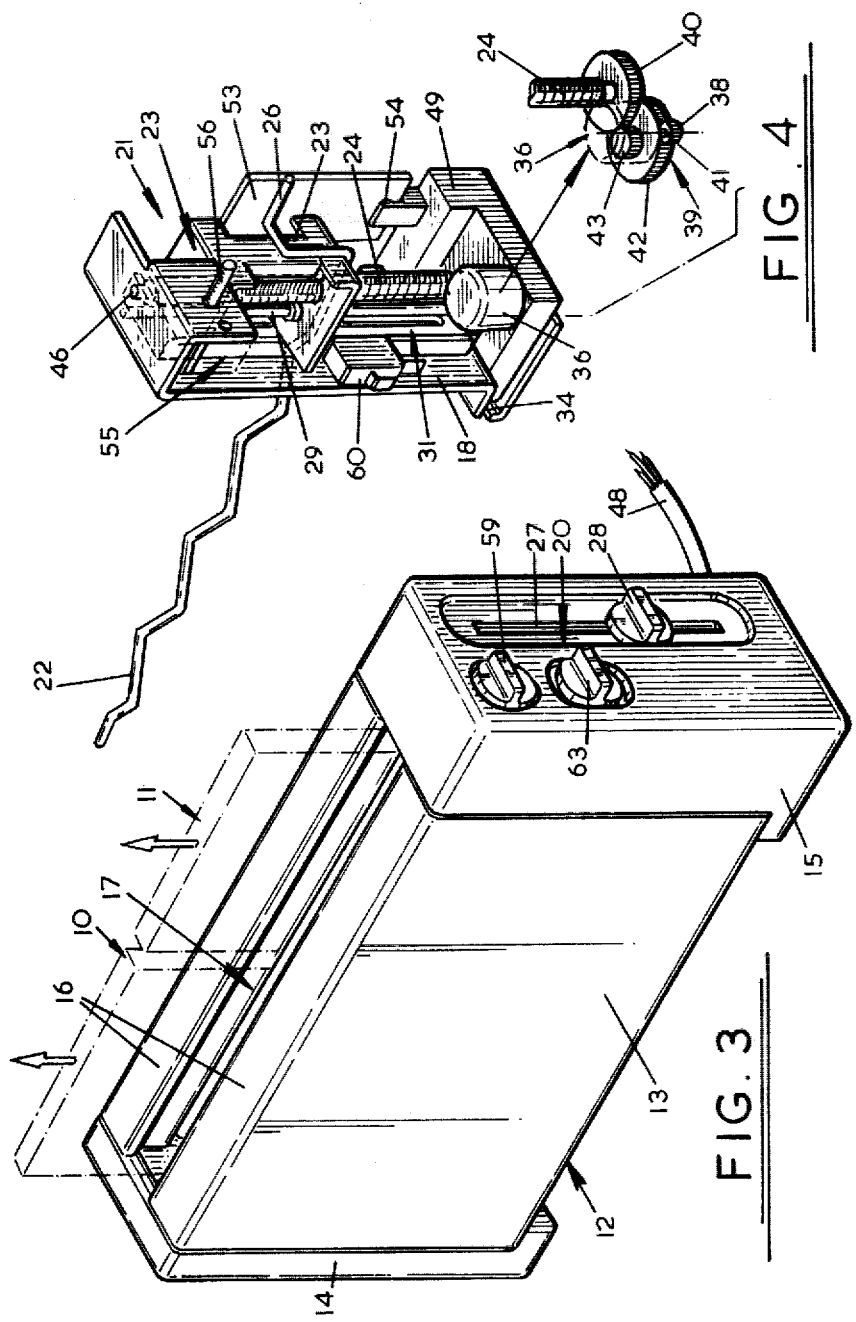

SLIDABLE BRUSH AND SCREW LINEAR DRIVE ARRANGEMENT

The present invention relates to a linear drive arrangement. Such linear drive arrangement may be advantageously employed in an electric toaster, and disclosed in applicant's copending application Ser. No. 235,272.

The object of the present invention is to provide a novel linear drive arrangement which has several advantages over known arrangements.

According to a first aspect of the present invention there is provided a linear drive arrangement characterised in that a prime mover is adapted to rotatably drive a screw threaded rod on which is mounted a carriage carrying a plurality of bristles which contact the screw threaded surface of the rod, operation of the prime mover to rotate the rod causing the bristles to follow the screw thread of the rod to drive the carriage along the rod.

Preferably, the bristles form brush means and are resilient so that the carriage can be slid over the rod by the application of force thereto, the bristles flexing to ride over the screw threaded surface of the rod.

Preferably, also, the carriage can be manually slid over the rod.

It will be appreciated, therefore, that the linear drive arrangement according to the present invention has no need of separate specific clutch means as the carriage can be moved over the rod by application of a force thereto or prevented from travel along the screw threaded rod when rotating by stop means. In the latter case, the bristles would merely flex over the screw threads of the rod without damage thereto. In addition, the drive arrangement is as silent as the prime mover as the passage of the carriage along the rod is noiseless. In order to reverse motion of the carriage, it is sufficient only to reverse the direction of rotation of the rod and to speed up or slow down the travel of the carriage it is necessary either to speed up or slow down the speed of rotation of the rod or to alter the pitch of the screw threads of the rod.

It can be seen therefore that the linear drive arrangement is suitable for use in equipment where loads are fairly low and there is advantages in using a simple, inexpensive arrangement with few working parts. Domestic equipment is, therefore, suitable for adaption to incorporate such a drive arrangement.

According to a second aspect of the present invention there is provided an electric toaster characterised in that it incorporates a linear drive arrangement according to the first aspect of the present invention.

The present invention will now be described, by way of example, with reference, in particular, to the application of the invention to an electric toaster as shown in the accompanying drawings in which:

FIG. 1 is a side elevation in partial cross section of part of an arrangement according to the present invention showing the mounting of a carriage on a rod;

FIG. 2 is a perspective view of the carriage shown in FIG. 1;

FIG. 3 is a perspective view of an electric toaster incorporating an arrangement according to the present invention;

FIG. 4 is a perspective view of the drive arrangement incorporated in the toaster shown in FIG. 3;

FIG. 5 is an exploded view of the drive arrangement shown in FIG. 4; and

Figure 6:
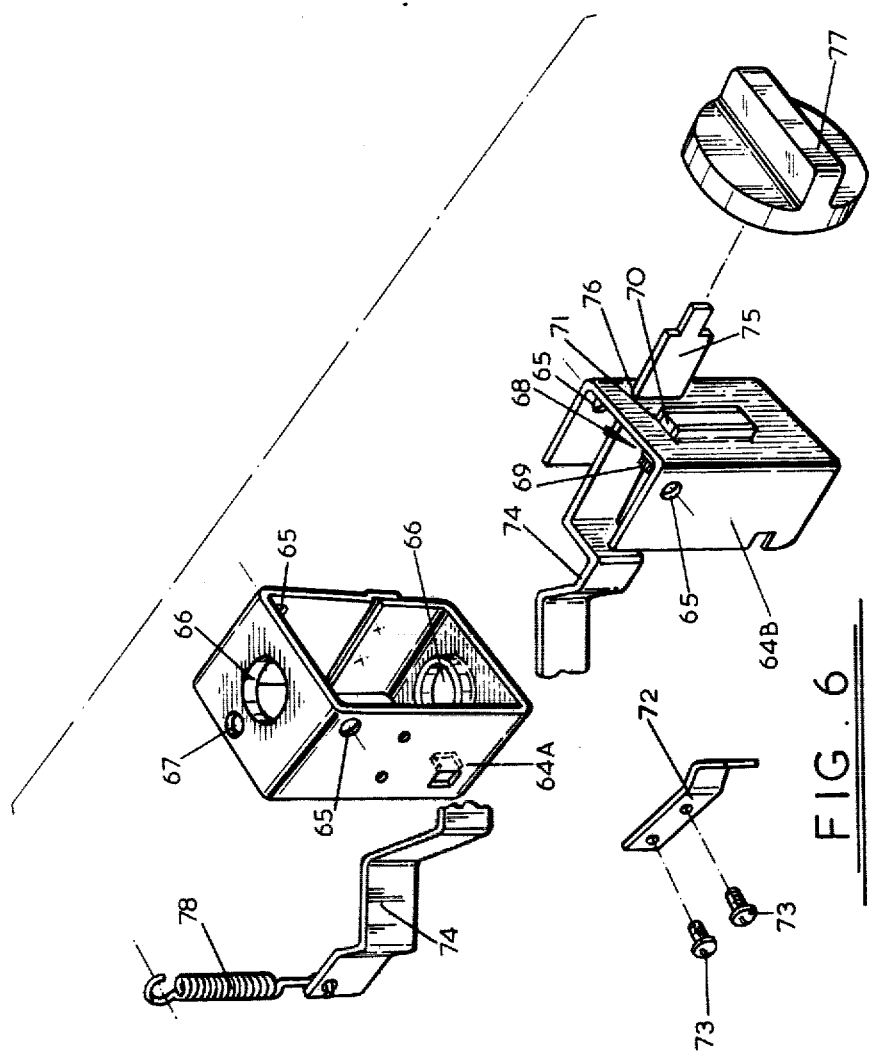
FIG. 6 is an exploded view of a modification of part of the drive arrangement.

Referring firstly to FIGS. 1 and 2, the drive arrangement shown therein comprises an externally screw-threaded rod 1 on which is mounted a carriage 2 incorporating brush means 3. A prime mover (not shown) such as an electric motor is arranged to rotate the rod 1 whereby the carriage 2 can be moved therealong via the brush means 3.

As shown particularly in FIG. 2, the carriage 2 comprises a one-piece member defining two coaxial holes 4 through which the rod 1 passes. A holder 5 is incorporated in the carriage, which holder comprises a channel-section member into which the brush means 3 are fitted. The brush member 3 comprises a brush 6 made up of a plurality of closely packed bristles which are attached to a backing block 7. The block 7 is fitted into the holder 5 so that the bristles of the brush 6 project from the holder 5 and engage the screw-threaded surface of the rod 1.

The brush 6 is preferably made of resilient flexible bristles such as natural bristles, for example badger hairs, nylon bristles or metallic bristles such as aluminum bristles. To ensure good contact between the brush 6 and the rod 1, the block 7 can be spring biassed towards the rod 1 or screws can thrust the block 7 towards the rod 1.

In use, when the rod 1 is rotated by the prime mover, the bristles of the brush 6 follow the screw threads formed on the rod 1 so that carriage 2 is forced to move along the rod 1 in a direction according to the direction of rotation of the rod 1. However, it is also possible to slide the carriage 2 along the rod 1 by external force in order, for example, to reset the position of the carriage 2 or to adjust the position thereof. If the bristles of the brush 6 are sufficiently flexible and the drive arrangement made a convenient size then the carriage 2 may be movable by hand. Sliding movement of the carriage 2 over the rod 1 causes the bristles of the brush 6 to flex and ride over the screw-threaded surface of the rod 1 so that the bristles act as a clutch mechanism by engaging the screw-threads when the rod 1 is being rotated and riding over the rod 1 when the carriage 2 is itself moved by force.

The application of the abovedescribed drive arrangement to an electric toaster will now be described.

The toaster, as shown in FIG. 3, is intended to toast simultaneously two slices 10 and 11 of a large loaf, which are disposed in an edge-to-edge relationship. The size of the toaster will determine the maximum size of bread slice which can be accommodated but in general the toaster will accommodate most sizes and shapes of bread slices as well as similar products such as muffins and crumpets.

The toaster comprises a box-like casing 12 made up of opposed side wall members 13, a base plate (not shown), and two end wall members 14 and 15. The top face 16 of the toaster does not comprise a separate member but is defined by portions of the side members 13 and the end members 14 and 15, which portions are disposed perpendicularly to the sides and ends of the casing 12 and define a rectangular aperture 17. The end wall members 14 and 15 also provide feet for the toaster below the level of the base plate. The aperture 17 enables the bread slices 10 and 11 to be introduced into the casing 12 for toasting. The end wall member 15 is of a greater size than the end wall member 7 and is provided with an additional wall 18 to form a box casing at one end of the toaster in which is located a linear drive arrangement 19, as described above. The end wall members 14 is provided with a pair of recesses (not shown) and the wall member 8 accommodates three control knobs 20, as is described below, whereby the recesses and the knobs 20 form hand grips for transport of the toaster.

Located within the casing 3 adjacent the side and end wall members 13 and 14 and the wall 18 respectively are shiny metal reflector plates (not shown). The upper parts of the side wall reflector plates are horizontally cranked towards the side wall members 13, which are completely covered by the plates. A pair of electrical heating elements are disposed respectively in each of the cranked portions of the side reflector plates and lie horizontal adjacent the longer sides of the aperture 17.

Electrical wiring (not shown) for supplying power to the heating elements leads from the elements to circuitry contained within the casing formed by the end wall member 15 and the wall 18.

The base plate also comprises a reflective plate and forms a crumb tray (not shown) which is located between the side walls 13 and is hinged so that it can pivot outwardly of the toaster. In this way, crumbs which have fallen on the plate can be removed therefrom.

The bread slices 10 and 11 are guided whilst they are located in the toaster by a pair of grilles (not shown) which are located respectively adjacent the side reflector plates. The grilles comprise a series of spaced vertical wires attached to and between upper and lower horizontal wires and are connected to the end reflector plates. The grilles cover the heating elements and retain the bread slices 10 and 11 in an approximately vertical position during toasting.

A reciprocable framework 21 (FIGS. 4 and 5) for carrying the bread slices 10 and 11 is located within the casing 12 between the side wall reflector plates and the grilles. The framework 21 comprises a horzontally disposed bread support member 22 which is attached at one end thereof to the carriage 23 of a drive arrangement as described above, after having passed through a vertical slot formed in the wall 18 and respective reflector plate. The support member 22 comprises a wavy wire member which can support the lower edge of a slice of bread when located vertically in the toaster. The other end of the support member 22 locates in a similar vertical slot formed in the respective end reflector plates adjacent the wall member 14. The vertical slots in the reflector plates form guides for the vertical reciprocable movement of the support member 22. It will be appreciated that the uppermost position of the support member 22 is made possible by the length of the slots is arranged to be above or at the same level as the electrical elements so that the bread slices carried by the support member 22 can be completely toasted on both sides as the support member 22 moves upwardly.

The carriage 23 is mounted to travel over a screw threaded rod 24 that is vertically located within the casing 18. The carriage 23 is identical to that described with reference to FIGS. 1 and 2 above and incorporates brush means 3 with a brush 6 attached to a backing block 7, the bristles of the brush 6 engaging the screw threads formed on the surface of the rod 24.

The tip 26 of the support member at the end which is attached to the carriage 23 passes out of the casing 18 through a vertical elongate slot 27 formed in the end wall member 15. The tip 26 has snap fitted thereto a control knob 28 and firm manual movement of the knob 28 downwardly causes the carriage 23 and thereby the bread support member 22 to move downwardly in the toaster by causing the bristles of the brush 6 to flex resiliently and ride over the screw threads of the rod 24. The framework for the bread can also be made to move upwardly in the toaster by movement of the knob 28 upwardly but this is not intended to be necessary in correct operation of the toaster.

To prevent the carriage 23 from tending to rotate when travelling over the rod 24, a thick wire 29 is located through a second pair of aligned holes 30 in the carriage 23. An elongate member 31 floats on the wire for a purpose which is described below and the upper end of the wire 29 is connected to an overhanging portion 32 of the wall 18 whereas the lower end of the wire 29 is connected to a hollow support block 33.

The hollow support block 33 is located at the base of the end wall member 15 and is accommodated in a recess 34 at the base of the wall 18. The block 33 comprises an upper surface 35 on which is located on electric motor 36. The motor 36 is held in position by screws 37. Beneath the surface 35 in a chamber of the block 33 are located gear wheels 38, 39 and 40. The gear wheel 38 is driven directly by the output spindle 41 of the motor 36, which spindle 41 passes through the surface 35 of the block 33. The gear wheels 38 drives the larger 42 of two toothed wheels 42, 43 forming the gear wheel 39, which wheel 42 causes the wheel 43 to rotate and to drive the gear wheel 40. A spigot 44 at the lower end of the rod 24 passes through an aperture 45 in the surface 35 and is connected to the centre of the gear wheel 40. The upper end 46 of the rod 24 locates in a hole 47 in the overhanging portion 29 of the wall 18 in such a manner that the rod 24 is free to rotate when it is driven by the motor 36 via the reduction gearing.

The toaster is intended to be powered by a mains electricity supply via a cable 48. The cable 48 enters the casing 12 at the lower portion of the end wall member 15 and enters a chamber 49 of the block 33 adjacent the chamber accommodating the gear wheels 38, 39, 40. Within the chamber 49 the cable 48 is securely retained by means of a clamp 50 and is connected to a terminal block 51 at one end of the block 33. Connections 52 project from the upper surface of the block 51 and are connected via a dropper resistor (not shown) to a printed circuit board 53 which is attached by a clip 54 to the block 33. This board 53 controls operation of the motor 36 but the heating elements are powered directly from the cable 48 via the terminal block 51.

The speed of the motor 36 is controlled by a potentiometer 55 (FIG. 4) which is also wired into the board 53 and which is attached to the wall 18 beneath the overhang thereof behind a depending portion 57 thereof. The potentiometer 55 comprises a horizontal rod 56 which is located projecting from the depending portion 57 of the wall 18. The rod 56 passes through an aperture 58 in the end wall member 15 and is connected to a knob 59. This second knob 59 is disposed adjacent the knob 28 and rotation of the knob 59 alters the setting of the potentiometer 55 which controls the degree of toasting. As is described below, the speed of the motor 36 affects the degree of toasting so that the control knob 59 is used for preselection of the degree of toasting required before use of the toaster. The knob 59 can be rotated to alter the setting of the potentiometer 55 and the potentiometer 55 can be arranged such that the setting can be varied infinitely between an upper and a lower setting or varied between a plurality of predetermined settings.

Operation of the motor 36 and the heating elements is controlled via a microswitch 60 when the toaster is connected to a mains electricity support. The microswitch 60 is connected to the circuit board 53 and is attached to the wall 18. The member 31 trips the microswitch 60 on and off via projections (not shown). The member 31 floats on the wire 29 and is affected by movement of the carriage 23 so that the lowermost position and the uppermost position of the framework causes the member 31 to trip the microswitch 60. Location of the framework in the lowermost position causes activation of the motor 36 and operation of the heating elements whereas location of the carriage in the uppermost position causes deactivation of the motor 36 and the switching off of the elements. In addition, a rod 61 projects from the member 31 through a slotted aperture 62 in the end wall member 8. A third control knob 63 is connected to the rod 61 so that if the knob 63 is moved upwardly or downwardly the rod 61 causes the member 31 to trip the microswitch 60 off or on. This third control knob 63 thus acts as an override and is intended to be used in two situations. Firstly, if the slice of bread to be toasted is smaller than the height of the total possible travel distance of the bread support 22, then the support 22 need only be depressed, as is described below, by a sufficient distance to toast the smaller bread size adequately. However, as in this case the carriage will not cause the member 31 to activate the microswitch 60 to put the motor 36 and the elements in operation, the override can be used by way of the knob 63 to trip the microswitch 60 to activate these components. Secondly, as a safety measure, the knob 63 can also be used to cut off electrical power to the motor 36 and the elements.

In use, the toaster is connected to a mains electricity supply via the cable 48 and the bread slices 10 and 11 to be toasted are located through the aperture 17 in a side-by-side relationship. The bread support member 22 should normally be in its uppermost condition so that the bread slices 10 and 11 rest on the support 22. The control knob 59 is then adjusted to preselect the degree of toasting required so that the speed of the motor 36 is controlled by the potentiometer 55. The control knob 28 is then depressed so that the support member 22 and the carriage 23 are lowered and the bristles of the brush 6 ride over the screw threaded surface of the rod 24. When the support member 22 reaches its lowermost position it causes the member 31 to activate the microswitch 60 which causes immediate heating of the elements. The motor 36 is also activated and may operate immediately or after a predetermined delay to drive the rod 24 against the surface of which the bristles of the brush 6 press. These bristles follow the screw threads formed on the rod 24 so that the carriage 23 and thereby the support member 22 are forced to move upwardly, the carriage 23 passing over the rod 24. As the support member 22 rises, the bread slices 10 and 11 are passed between the heating elements and progressively toasted on both sides, the degree of toasting depending on the speed of travel of the carriage 23 which in turn depends on the speed of rotation of the rod 24 and the speed of the motor 36. As the carriage 23 rises the toasted bread slices pass out of the toaster through the aperture 17. When the carriage 23 reaches its uppermost position, the support member 22 causes the member 31 to trip the microswitch 60 so that the electricity supply to the heating elements and the motor 36 is cut off. The bread slices 10 and 11 have now been toasted completely and remain resting on the support member 22 and against the sides of the aperture 17 until removed and further bread can then be toasted in exactly the same way as described above.

The linear drive arrangement described above affords the toaster several advantages over conventional domestic toasters. Firstly, if nonmetallic bristles are used for the brush 6 the electrical safety of the appliance is increased. Secondly, the drive arrangement of the toaster is quiet in operation, as the action of the brush 6 on the rod 24 produces little noise. Finally, the brush 6 permits the toaster to be operated manually with ease and employs the simple clutch mechanism of the brush means which are less likely to cause faults than conventional arrangements.

In some applications of the drive arrangement according to the invention, when the components attached to the carriage are heavy, the bristles of the brush must be made short so that they do not flex under the weight of the components and thereby prevent the carriage from being driven along the rod. In these cases, it may still be desirable to move the carriage along the rod manually to re-set same but the short length of the bristles require a greater force to be applied thereto than longer bristles. Hence, although it is still possible to slide the carriage manually over the rod, in these circumstances it may be desirable to provide a clutch mechanism whereby the brush can be moved off the rod so that the carriage can be slid over the rod without impedance from the brush. With reference to the toaster described above, such a clutch arrangement is shown in FIG. 6.

The carriage 23, as shown in FIG. 6, comprises two elements 64A and 64B which are pivotally connected at pivot points 65. The element 64A comprises a rectangular frame and is provided with a pair of aligned holes 66 in opposing sides thereof through which a screw-threaded rod (not shown) passes. A second pair of aligned holes 67 is also provided adjacent the holes 66 for a guide wire (not shown). The element 64B is substantially a channel shaped member which fit around one side of the frame formed by the element 64A. The pivot points 65 are aligned at the top corners of the element 64B so that the element 64B can pivot about a horizontal axis away from the element 64A.

Attached to the element 64B are brush means 68 which comprise a plurality of bristles 69 attached to a backing block 70. The block 70 locates in an aperture 71 formed in the element 64B, which aperture 71 is positioned so that, when the element 64B is fitted around the element 63, the bristles 69 are so positioned that they engage the screw threaded surface of the rod and, when the element 64B is pivoted away from the element 64A, the bristles 69 are lifted off the rod. To ensure that the bristles 69 engage the rod with sufficient force when the element 64B is fitted around the element 63, a leaf spring 72 is attached by rivets 73 or similar to one side of the element 64A to locate between the elements 64A and 64B are thereby bias the element 64B towards the element 64A and the bristles 69 on the rod. Pivotal movement of the element 64B away from the element 64A is, therefore, accomplished against the force of the spring 72.

The wavy wire member 22 described above as part of the framework 21 is replaced in this embodiment by a fabricated member 74. This member 74 passes through the element 64A and one end 75 thereof locates through a slot 76 formed in the element 64 and has a knob 77 attached thereto. Owing to the engagement of the member 74 in the slot 76, upward movement of the knob 77 causes the element 64 to pivot away from the element 64A and thereby lifts the bristles 69 off the rod. In this way, the elements 64A and 64B can be moved over the rod without impedance from the bristles 69.

In a further modification, with particular reference to the application of the drive arrangement of the invention to a toaster, the end of the member 74 remote from the drive arrangement may be attached to a counterbalancing spring 78 which is also attached to a fixed upper portion of the casing of the toaster. The spring 78 counterbalances the weight of the framework and the bread slices and prevents the end of the member 74 remote from the drive arrangement from drooping as the framework rises.

It will be appreciated that the drive arrangement of the present invention has many other applications apart from in the toaster described above. Apart from the advantages stated above with respect to the toaster, the arrangement also has the advantage that the speed of movement of the carriage can be controlled by the pitch of the screw-threads, the carriage moving along the rod the distance of one thread pitch per each rotation of the rod. In addition, the carriage can be moved in the opposite direction by reversing the rotational direction of the rod.

What is claimed is:

1. A linear drive arrangement comprising a screw threaded rod, a prime mover adapted to rotatably drive said screw threaded rod, a carriage mounted on the screw threaded rod, and a plurality of bristles which are carried by the carriage and which contact the screw threaded surface of the rod, operation of the prime mover to rotate the rod causing the bristles to follow the screw thread of the rod to drive the carriage along the rod, said bristles forming brush means and being sufficiently resilient so that the carriage can be slid over the rod by the application of force thereto, the bristles flexing to ride over the screw threaded surface of the rod.

2. An arrangement as claimed in claim 1, in which the carriage can be manually slid over the rod.

3. An arrangement as claimed in claim 1, in which the carriage defines two coaxial holes through which the rod passes and between which the bristles contact the threaded surface of the rod.

4. An arrangement as claimed in claim 1, in which the carriage comprises a first element, which is mounted on the rod, and a second element, which carries the plurality of bristles and is attached to the first element whereby in a first position relative to the first element the bristles contact the screw-threaded surface of the rod and in a second position the bristles are held off the rod to enable the first and second elements to slide over the rod.

5. An arrangement as claimed in claim 1, in which the carriage is mounted to travel along a wire mounted parallel with the rod to prevent the carriage travelling around the rod.

6. An arrangement as claimed in claim 1, in which control means are provided for the prime mover whereby the speed of rotation of the rod can be varied to alter the speed at which the carriage is driven along the rod.

7. A linear drive arrangement comprising a screw threaded rod, a prime mover adapted to rotatably drive said screw threaded rod, a carriage mounted on the screw threaded rod, and a plurality of bristles which are carried by the carriage and which contact the screw threaded surface of the rod, operation of the prime mover to rotate the rod causing the bristles to follow the screw thread of the rod to drive the carriage along the rod, wherein the carriage comprises a first element, which is mounted on the rod, and a second element, which carries the plurality of bristles and is pivotally attached to the first element whereby in a first position thereof relative to the first element the bristles contact the screw-threaded surface of the rod and in a second position thereof the bristles are held off the rod to enable the first and second elements to slide over the rod.

8. An arrangement as claimed in claim 4 or 7 in which resilient biassing means are provided to bias the second element into the first position.

9. A linear drive arrangement comprising a screw threaded rod, a prime mover adapted to rotatably drive said screw threaded rod, a carriage mounted on the screw threaded rod, and a plurality of bristles which are carried by the carriage and which contact the screw threaded surface of the rod, operation of the prime mover to rotate the rod causing the bristles to follow the screw threaded of the rod to drive the carriage along the rod, wherein the carriage is mounted to travel along a wire mounted parallel with the rod to prevent the carriage traveling around the rod.

* * * * *